(12) United States Patent
Sandford

(10) Patent No.: US 7,287,758 B2
(45) Date of Patent: Oct. 30, 2007

(54) CYLINDER HEAD GASKET WITH AN OIL DRAINBACK TUBE FASTENER

(75) Inventor: Greg Sandford, Chicago, IL (US)

(73) Assignee: Dana Corporation, Toledo, OH (US)

( * ) Notice: Subject to any disclaimer, the term of this patent is extended or adjusted under 35 U.S.C. 154(b) by 172 days.

(21) Appl. No.: 11/269,078

(22) Filed: Nov. 8, 2005

(65) Prior Publication Data

US 2007/0102887 A1 May 10, 2007

(51) Int. Cl.
F02F 11/00 (2006.01)

(52) U.S. Cl. .................... 277/598; 123/193.3

(58) Field of Classification Search ............. 123/193.3; 277/598
See application file for complete search history.

(56) References Cited

U.S. PATENT DOCUMENTS

| 2,395,243 | A |   | 6/1944  | Aukers            |         |
|-----------|---|---|---------|-------------------|---------|
| 2,679,241 | A |   | 11/1950 | Dickson           |         |
| 3,570,374 | A |   | 3/1971  | Stratton          |         |
| 4,653,761 | A |   | 3/1987  | Baugh et al.      |         |
| 4,756,491 | A | * | 7/1988  | Abraham           | 123/196 S |
| 4,784,396 | A | * | 11/1988 | Scott et al.      | 277/598 |
| 5,096,325 | A | * | 3/1992  | Udagawa           | 277/598 |
| 5,105,777 | A |   | 4/1992  | Kronich et al.    |         |
| 5,203,576 | A | * | 4/1993  | Miyaoh et al.     | 277/598 |
| 5,344,165 | A | * | 9/1994  | Miyaoh et al.     | 277/595 |
| 5,536,024 | A | * | 7/1996  | Udagawa           | 277/595 |
| 5,906,376 | A |   | 5/1999  | Udagawa et al.    |         |
| 6,237,557 | B1 |  | 5/2001  | Wiegert           |         |
| 6,318,734 | B1 |  | 11/2001 | Boskamp           |         |
| 6,485,028 | B1 | * | 11/2002 | Smith            | 277/598 |
| 2002/0020969 | A1 | * | 2/2002 | Belter           | 277/591 |

* cited by examiner

*Primary Examiner*—Erick Solis
(74) *Attorney, Agent, or Firm*—Marshall & Melhorn LLC

(57) ABSTRACT

A gasket includes at least one gasket layer. The gasket layer has a push rod or cam timing chain opening formed therein. A clip is secured to the gasket layer and positioned within the push rod or timing chain opening. The clip selectively receives and positions an oil drain tube within the push rod or timing chain opening.

18 Claims, 3 Drawing Sheets

CYLINDER HEAD GASKET WITH AN OIL DRAINBACK TUBE FASTENER

BACKGROUND

The present invention relates generally to a cylinder head gasket for automotive internal combustion engines. More specifically, the present invention relates to a cylinder head gasket having an oil drain back tube fastener therein.

Overhead valve internal combustion engines include a cylinder block portion and a cylinder head which are bolted together. In a pushrod engine, the cylinder block includes at least one cylinder bore opening to an end face and a push rod cavity spaced from and generally parallel to the cylinder bore and opening to the end face of the cylinder block. In an overhead cam engine, there is an open timing chain cavity where the cylinder head and crankcase mate to a timing chain cover and oil drains back into the crankcase. The cylinder head includes a corresponding number of combustion chambers forming the top of the cylinder bores, at least one intake valve and exhaust valve allowing communication of each combustion chamber with intake and exhaust ports, respectively, valve springs, rocker arms, and a push rod cavity or timing chain cavity. The combustion chamber and push rod or timing chain cavity of the cylinder head open to an end face in alignment with their counterparts in the cylinder block.

A gasket is provided between the end faces of the cylinder block and the cylinder head to seal the interface therebetween. The gasket includes a cutout to surround the pushrod cavity and a plurality of bolt holes and cylinder bore apertures to mate with the cylinder bores of an engine block.

Combustion engines may also include oil drain tubes that drain oil from an air/oil separation unit into a crankcase. Known oil drain tubes are positioned external to the combustion engine, thereby requiring the oil drain tube to be configured to avoid packaging issues and complicating assembly issues. Therefore, it is desirable to route an oil drain tube through the cylinder head of an engine.

However, routing an oil drain tube through a cylinder head creates packaging issues. More specifically, pushrods and other valve train components are difficult to avoid, especially if the oil drain tube is not securely anchored inside the engine in such a manner so as to eliminate positional movement. Further, difficulties also arise in installing a long rigid drain tube inside the engine. For example, it is difficult to maneuver and position the oil drain tube within the engine and connecting it to the air/oil separation unit. It may also be difficult to find an area inside the cylinder head or crankcase that would allow for the installation of fasteners for mounting or attaching the oil drain tube to the cylinder head or crankcase. Therefore, there exists a need for a mechanism to secure an oil drain tube to an existing structural component in a cost-effective manner.

SUMMARY

An embodiment of the present invention is directed to a cylinder head gasket having at least one gasket layer. The gasket layer includes a push rod opening formed therein. A clip is secured to the gasket layer and positioned within the push rod opening. The clip selectively receives and positions an oil drain tube within the push rod opening.

In an alternative embodiment, the gasket is provided with an integral protrusion that extends from a periphery of the gasket into the push rod opening. An opening is formed through the protrusion for selectively receiving and positioning an oil drain tube within the push rod opening.

BRIEF DESCRIPTION OF THE DRAWINGS

The accompanying drawings illustrate various embodiments of the present apparatus and are a part of the specification. The illustrated embodiments are merely examples of the present apparatus and do not limit the scope of the disclosure.

DETAILED DESCRIPTION

Figure 1:
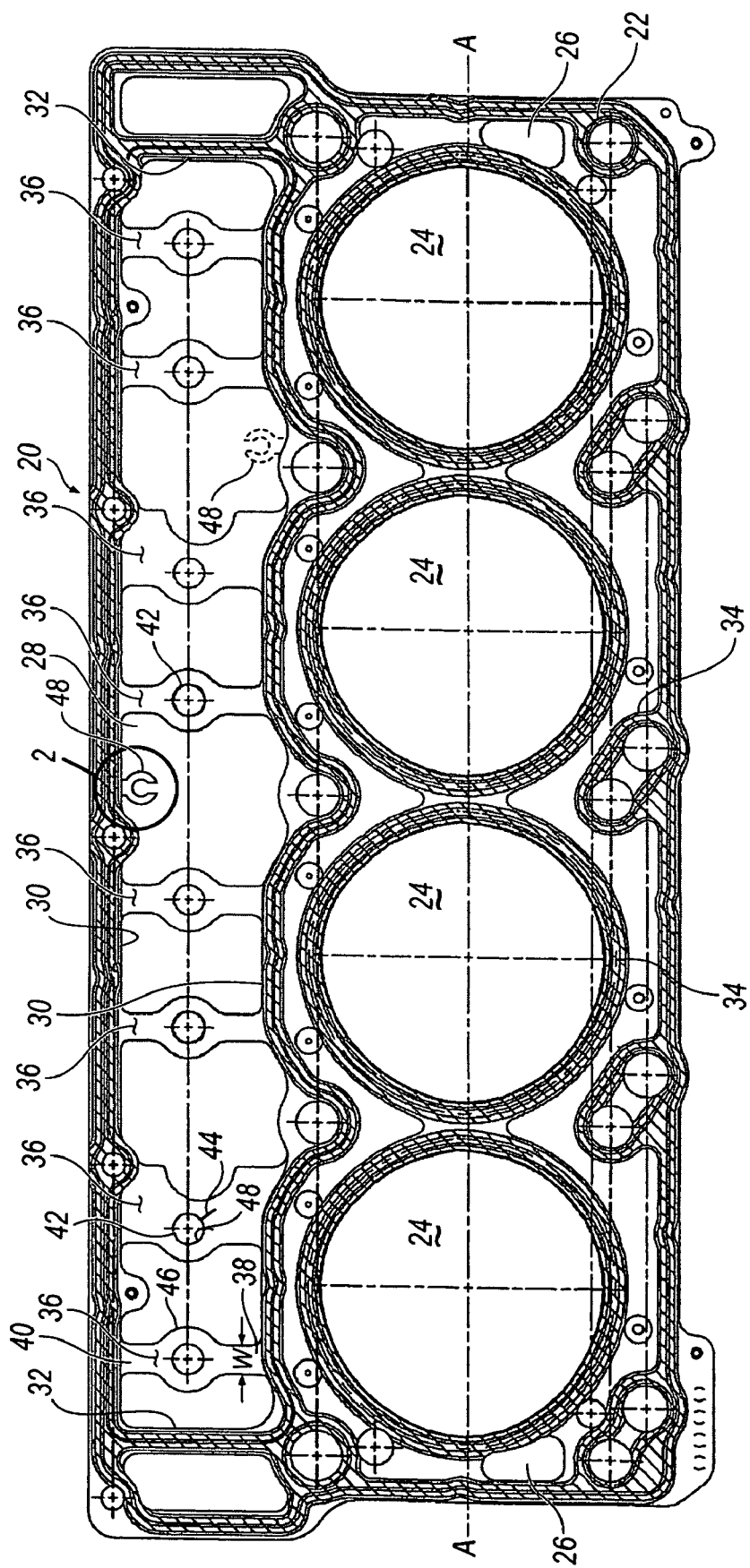
FIG. 1 is a top plan view of one embodiment of a cylinder head gasket that includes a push rod opening.
Figure 1A:
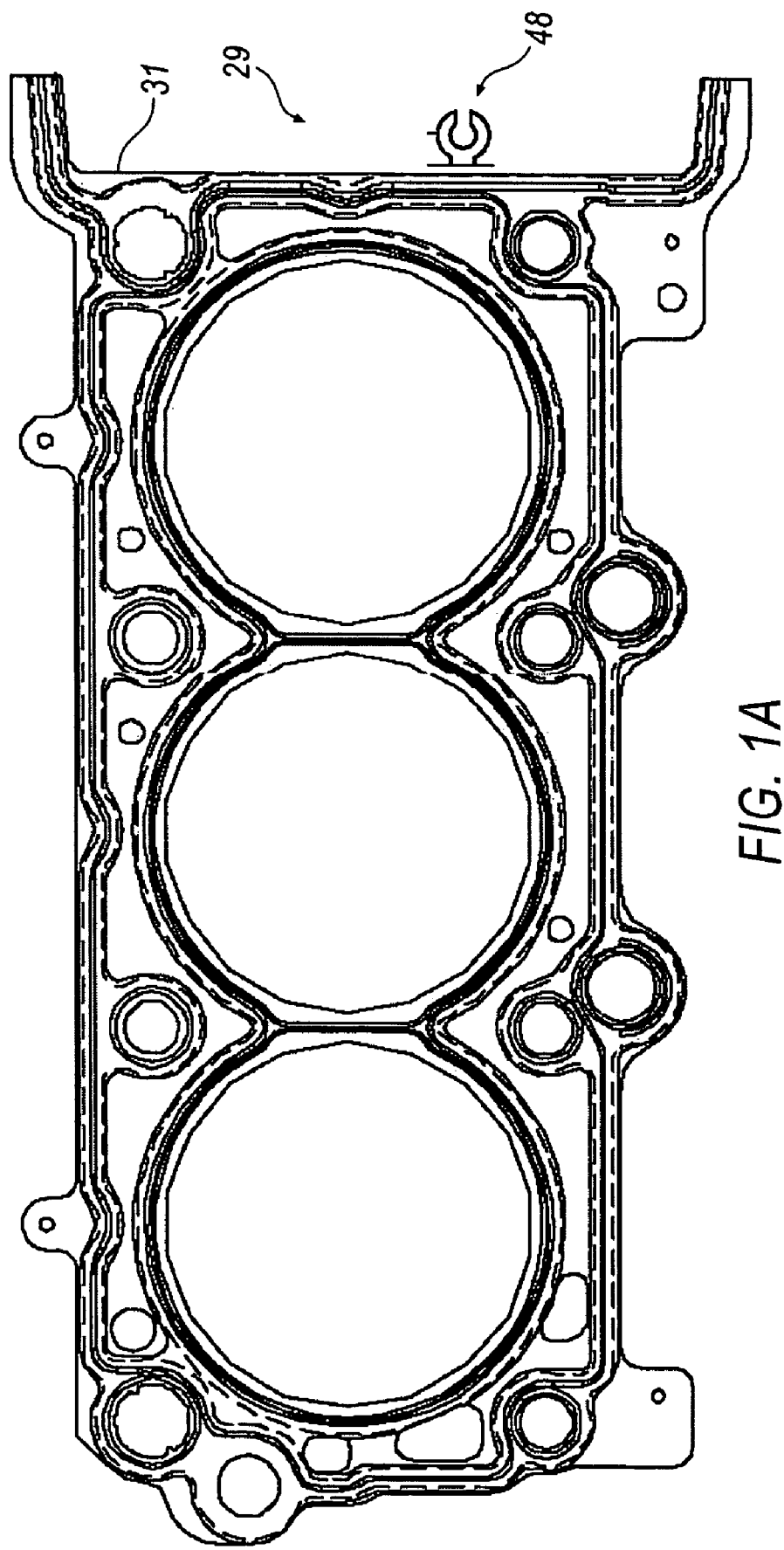
FIG. 1A is a top plan view of another embodiment of a cylinder head gasket that includes a timing belt opening.
Figure 4:
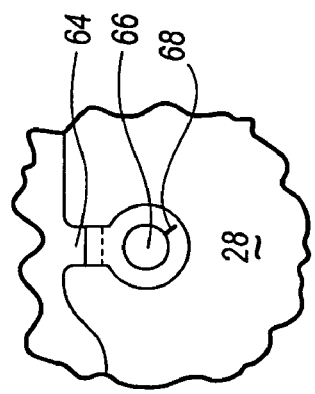
FIG. 4 is a partial plan view of a third embodiment of a cylinder head gasket in accordance with the present invention.

FIG. 1 shows a gasket 20 for use with an internal combustion engine. Gasket 20 has a plurality of bolt holes 22 and combustion apertures 24 that are adapted to mate with cylinder bores of an engine block. Gasket 20 may also be provided with second apertures 26 that serve as fluid flow openings for engine coolant and the like. Additionally, gasket 20 also includes a large opening 28 sized and shaped to fit around a push rod cavity (not shown) or timing chain cavity 29 (see FIG. 1A). Push rod opening 28 is defined by two opposed peripheral edges 30 extending in a direction generally parallel to the axis A-A of the cylinder bores 24, and two opposed short edges 32 interconnecting long edges 30 together. Timing chain cavity 29 is defined by an edge 31 positioned on one side of the gasket 20, as shown in FIG. 1A. Gasket 20 may further includes a plurality of sealing embossments 34, rubber beads, stoppers or other sealing mechanisms provided at conventional locations about apertures 24, 26. Embossments 34 may be of any conventional size and shape, and are designed to prevent leaks when the engine is assembled.

Prior to assembly of a cylinder block to a cylinder head, the gasket 20 is appropriately located on the bore. For the embodiment shown in FIG. 1, push rods (not shown) are then inserted into the push rod cavity through the push rod opening 28. To assist in locating the push rods in place prior to attaching the cylinder head, gasket 20 is provided with a plurality of bridges 36, each one designed to receive and locate a push rod in place. Bridges 36 are attached to an outer periphery of the push rod opening 28.

As seen in FIG. 1, each cylinder bore 24 is associated with two push rod support bridges 36, one each for an intake and an exhaust valve push rod. Each bridge 36 includes first and second ends 38, 40 respectively attached to opposing peripheral edges 30 of push rod opening 28. Additionally, each bridge 36 includes a push rod locator hole 42 for receiving a push rod therethrough.

In one embodiment, locator holes 42 are aligned in a row parallel to axis A-A, and are precisely located to guide push rod insertion and to support the push rod in the appropriate location for engine assembly. To assist with push rod insertion, locator holes 42 may include one or more slits 44 extending radially therefrom to allow the hole to enlarge in response to insertion of a push rod. In this way, a tight fit between the push rod and the bridge may be obtained, thereby locking the push rod in place. Alternatively, locator holes 42 are sized and shaped to closely conform to the outer surface of the push rod without deforming as the push rod is inserted, while allowing a small amount of clearance between the aperture inner edge 48 to allow push rod reciprocation during engine operation.

In one embodiment, bridges 36 have a generally circular outer contour 46 intermediate ends 38, 40 to provide sufficient support for an inserted push rod. Additionally, ends 38, 40 have a width W sufficiently large to prevent breaking or tearing of the bridge during push rod assembly. However, since bridges 36 are designed only to support the push rod prior to assembling an engine cylinder block to an engine head, the size and shape of each bridge 36 need only be sufficient to maintain the location of each push rod within acceptable tolerances. Accordingly, bridges 36, and especially the portion of bridges 36 surrounding locator holes 42, must be strong enough to support the push rod only until assembly of the engine.

Gasket 20 further includes at least one clip 48 to receive and locate an oil drain tube 50 (shown in phantom in FIG. 2) within an engine, rather than external to it. Clip 48 includes a base portion 52, a body portion 54, and an opening 56. In a pushrod engine, base portion 52 extends from a peripheral edge 30 of gasket 20 into the open space of push rod opening 28. In the illustrative embodiment shown, clip 48 extends from the intake edge of gasket. However, clip 48 may be positioned at any suitable location within push rod opening 28. For example, clip 48 may be located on the inboard side of push rod opening 28 (shown in phantom in FIG. 1) or along the pushrod guide itself.

In an overhead cam engine, base portion 52 extends from peripheral edge 31 of gasket 20 into the open space of the timing chain cavity 29. In the illustrative embodiment shown, clip 48 extends from the front edge of the gasket, however, clip 48 may be positioned in any suitable location within the timing chain cavity 29.

Body portion 54 has opening 56 formed therein. Body portion 54 has a predetermined width W" sufficiently large to prevent breaking or tearing of clip 48 during oil drain tube 50 assembly. A slit 58 if formed in body portion 54, extending from a peripheral edge 60 of body portion 54 to opening 56. Slit 58 facilitates insertion of oil drain tube 50 during assembly. Clip 48 may further include an upwardly extending flange 62 that at least partially surrounds opening 56. Flange 62 provided additional support for oil drain back tube 50.

Figure 2:
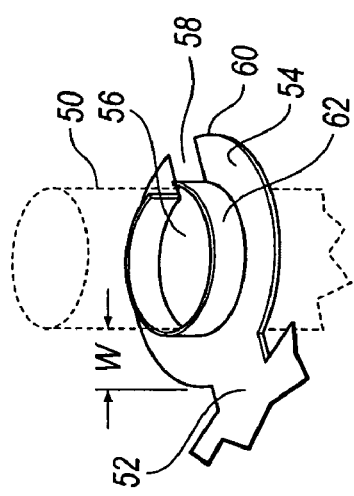
FIG. 2 is a detailed perspective view of area 2 of the gasket of FIG. 1.

In one embodiment, clip 48 is integrally formed with gasket 20. Gasket 20 is shown in FIGS. 1 and 2 as a multiple layer steel gasket, but could be formed from any conventional gasket material. However, the present invention is particularly suited to multiple layer metallic gaskets because only one of the layers need include the clip 48. In such an embodiment, the base 52 and body portion 54 may be stamped into one or more layers of a multiple-layered steel (MLS) gasket 20. Indeed, the hard temper of the steel could provide a "spring" to retain or guide an oil tube 50 in place. Alternatively, clip 48 could be stamped into the perimeter of a graphite bodied or other solid core gasket.

Since the clip 48 is integral to gasket 20, oil drain tube may be secured to an existing structural component in a cost-effective manner by eliminating the need for additional fasteners or bolt bosses within the engine. Further, the support features on the gasket 20 may be formed out of the existing gasket material, allowing for a one piece gasket 20 and clip 48, thereby eliminating extra assembly operations and components.

Figure 3:
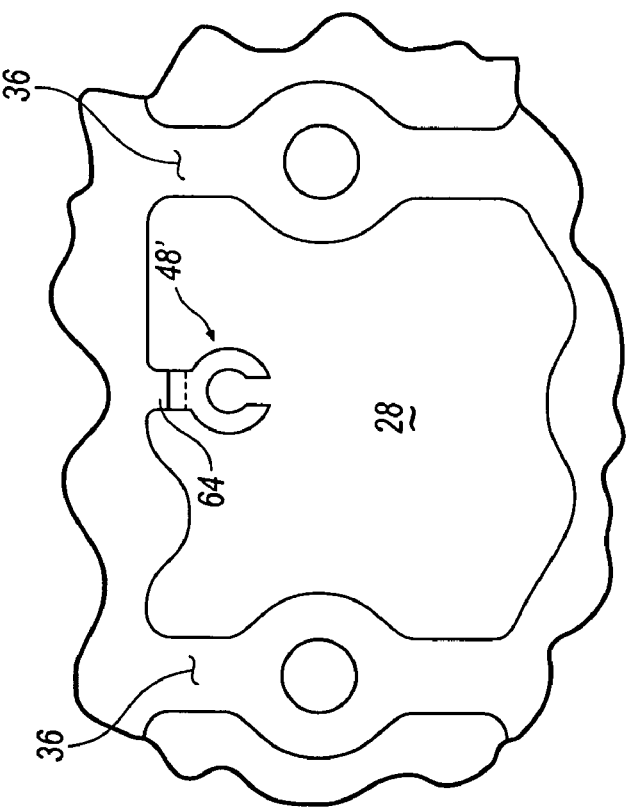
FIG. 3 is a partial plan view of a second embodiment of a cylinder head gasket in accordance with the present invention.

An alternative embodiment of the invention is shown in FIG. 3. In this embodiment, one or more layer of gasket 20 is provided with an integrally formed protrusion 64 that extends into the push rod opening 28 or timing chain cavity 29. A separate clip 48' is secured to protrusion 64 by welding, riveting or other suitable operation, thereby providing a one-piece gasket 20 that has an oil drain tube support.

In yet another embodiment, protrusion 64 may be provided with an opening 66. This embodiment is particularly suited for flexible oil drain tubes 50, where the oil drain tube 50 may be easily manipulated to be routed through opening 66. Opening 66 may also be provided with one or more slits 68 extending radially therefrom to allow the hole to enlarge in response to insertion of oil drain tube 50. Alternatively, opening 66 is sized and shaped to closely conform to the outer surface of the oil drain tube without deforming as the oil drain tube 50 is inserted.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A cylinder head gasket comprising:
   at least one gasket layer;
   wherein said gasket layer includes a push rod opening formed therein; and
   at least one clip secured to said gasket layer and positioned within said push rod opening, said clip selectively receiving and positioning an oil drain tube within said push rod opening.

2. The cylinder head gasket of claim 1, wherein said clip includes a base portion, a body portion and an opening formed in said body portion.

3. The cylinder head gasket of claim 2, further including an upwardly extending flange at least partially surrounding said opening.

4. The cylinder head gasket of claim 2, further including at least one slit that is in communication with said opening.

5. The cylinder head gasket of claim 4, wherein said slit extends from an outside periphery of said body portion to said opening.

6. The cylinder head gasket of claim 1, further including an integral protrusion that extends from an edge of said push rod opening, said clip being secured to said protrusion.

7. The cylinder head gasket of claim 6, wherein said clip is secured to said protrusion by welding.

8. The cylinder head gasket to claim 6, wherein said clip is secured to said protrusion by riveting.

9. The cylinder head gasket to claim 6, wherein said clip is secured to said protrusion by form-lock.

10. The cylinder head gasket of claim 1, wherein said gasket includes multiple gasket layers.

11. The cylinder head gasket of claim 10, wherein said gasket is a multiple-layered steel gasket.

12. The cylinder head gasket of claim 1, wherein said clip is located between a pair of bridges that span said push rod opening.

13. The cylinder head gasket of claim 12, wherein said bridges include a locator hole for receiving a push rod therethrough.

14. A cylinder head gasket comprising:
at least one gasket layer;
wherein said gasket layer includes a push rod opening formed therein; and
at least one protrusion integrally formed with said gasket layer, said protrusion extending away from a periphery of said gasket and within said push rod opening, said protrusion including an opening formed therein for selectively receiving and positioning an oil drain tube within said push rod opening.

15. The cylinder head gasket of claim 14, further including at least one slit extending radially from said opening.

16. The cylinder head gasket of claim 14, wherein said protrusion is located between a pair of bridges that span said push rod opening.

17. A cylinder head gasket, comprising:
at least one gasket layer;
wherein said gasket layer includes a timing chain opening formed therein; and
at least one clip secured to said gasket layer and positioned within said timing chain opening, said clip selectively receiving and positioning an oil drain tube within said timing chain opening.

18. The cylinder head gasket of claim 17, further including an integral protrusion that extends from an edge of said timing chain opening, said clip being secured to said protrusion.

* * * * *